United States Patent
Izadian et al.

(10) Patent No.: US 11,493,598 B2
(45) Date of Patent: Nov. 8, 2022

(54) MITIGATING MULTIPATH EFFECT ON RADARS FOR EFFECTIVE TARGET DETECTION

(71) Applicant: Woven Planet North America, Inc., Los Altos, CA (US)

(72) Inventors: Jamaledin Izadian, San Jose, CA (US); Mohammad Emadi, San Jose, CA (US)

(73) Assignee: Woven Planet North America, Inc., Los Altos, CA (US)

( * ) Notice: Subject to any disclaimer, the term of this patent is extended or adjusted under 35 U.S.C. 154(b) by 388 days.

(21) Appl. No.: 16/729,123

(22) Filed: Dec. 27, 2019

(65) Prior Publication Data
US 2021/0199760 A1 Jul. 1, 2021

(51) Int. Cl.
  G01S 7/41 (2006.01)
  G01S 7/292 (2006.01)
  G01S 13/44 (2006.01)
  G01S 13/931 (2020.01)
  G01S 13/58 (2006.01)

(52) U.S. Cl.
  CPC ............ G01S 7/411 (2013.01); G01S 7/2927 (2013.01); G01S 7/415 (2013.01); G01S 13/4418 (2013.01); G01S 13/582 (2013.01); G01S 13/931 (2013.01)

(58) Field of Classification Search
  CPC ........ G01S 7/411; G01S 7/2927; G01S 7/415; G01S 13/4418; G01S 13/931; G01S 13/87; G01S 13/582
  See application file for complete search history.

(56) References Cited

U.S. PATENT DOCUMENTS

| | | | | |
|---|---|---|---|---|
| 10,247,815 B1 * | 4/2019 | Koubiadis | ............. | G01S 7/2813 |
| 2004/0130480 A1 * | 7/2004 | Hellsten | ................ | G01S 13/878 |
| | | | | 342/146 |
| 2012/0056773 A1 | 3/2012 | Sato | | |
| 2015/0204966 A1 * | 7/2015 | Kishigami | ............. | G01S 13/42 |
| | | | | 342/189 |
| 2016/0154102 A1 | 6/2016 | Furxhi | | |

(Continued)

OTHER PUBLICATIONS

International Search Report and Written Opinion for International Application No. PCT/US2020/066718, dated Apr. 22, 2021.

(Continued)

*Primary Examiner* — Donald H B Braswell
(74) *Attorney, Agent, or Firm* — Christopher G. Darrow; Darrow Mustafa PC (57) ABSTRACT

In one embodiment, a method includes receiving a first signal associated with a first multipath effect from a first radar installed on a vehicle at a first height, receiving a second signal associated with a second multipath effect from a second radar installed on the vehicle at a second height, wherein the first height and the second height are different, wherein a difference between the first height and the second height is configured to generate a mitigation of the first multipath effect and the second multipath effect, and wherein the first radar and the second radar have an overlapping field of view, and determining that a target exists in the overlapping field of view based on the first signal and the second signal.

20 Claims, 5 Drawing Sheets

(56) References Cited

U.S. PATENT DOCUMENTS

| | | | |
|---|---|---|---|
| 2016/0161604 A1* | 6/2016 | Clark | G01S 13/424 |
| | | | 342/154 |
| 2017/0285141 A1* | 10/2017 | Chung | G01S 13/34 |
| 2017/0315229 A1* | 11/2017 | Pavek | G01S 13/931 |
| 2018/0325012 A1 | 11/2018 | Ferrari | |
| 2019/0079177 A1 | 3/2019 | Lee | |

OTHER PUBLICATIONS

Bilik et al., The Rise of Radar for Autonomous Vehicles: Signal Processing Solutions and Future Research Directions, IEEE Signal Processing Magazine, 12 pages, Sep. 2019.

* cited by examiner

510 — A computing system may receive, from a first radar, a first signal, wherein the first signal is associated with a first multipath effect, and wherein the first radar is installed on a vehicle at a first height.

520 — The computing system may identify a first signal power associated with the first signal.

530 — The computing system may determine, for a second radar, a second height at which to install the second radar on the vehicle, wherein the first height and the second height are different, wherein the determination is based on the first signal power, and wherein the first radar and the second radar have an overlapping field of view.

540 — The computing system may receive a second signal from the second radar, wherein the second signal is associated with a second multipath effect, and wherein a difference between the first height and the second height is configured to generate a mitigation of the first multipath effect and the second multipath effect.

550 — The computing system may determine that a target exists in the overlapping field of view based on the first signal and the second signal.

MITIGATING MULTIPATH EFFECT ON RADARS FOR EFFECTIVE TARGET DETECTION

BACKGROUND

Transportation management systems and/or autonomous driving systems may need to determine a variety of information about a vehicle and the geographic area where the vehicle is operating. Such information may be important for safe operation of vehicles. For example, accurately detecting pedestrians or other vehicles surrounding a driving vehicle is essential for vehicle controls in transportation management systems and/or autonomous driving systems. Safe operation of vehicles, in turn, will not only decrease the risk of road accidents but also reduce fuel consumption significantly. Transportation management systems and/or autonomous driving systems may need to analyze complex scenarios and correctly respond to multiple potential hazard. Among others, radar (Radio Detection and Ranging) systems may provide important sensor input for safe and reliable vehicle operations because they combine high resolution in range and depth perception, with the detection of objects like pedestrians, bicycles, and other vehicles. Radar systems use radio waves for long-range object and obstacle detection, as well as for tracking the velocity and direction of the various actors such as pedestrians, other vehicles, guardrails, etc., in the environment around the vehicle. Ensuring that these radar systems operate without interference, cover the intended areas, do not fail from installation effects and provide accurate input to the control system for vehicle operations requires the usage of advanced technologies.

A radio signal spreads out in different directions as it radiates away from the broadcast antenna. Parts of the spreading signal may encounter reflecting surfaces, and the signal may scatter off these objects. In an urban environment, the signal might reflect off buildings, moving vehicles, or other objects. Such propagation phenomenon of radio signals reaching the receiving antenna by two or more paths is considered multipath. One signal may travel directly from the transmitter to the receiver. This signal is usually (but not always) the strongest signal present in the receiving antenna. The other signals may arrive at the receiving antenna via more roundabout paths. Multipath causes multipath interference, including constructive and destructive interference, and phase shifting of the signal.

DESCRIPTION OF EXAMPLE EMBODIMENTS

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described. In addition, the embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

Transportation management systems and/or autonomous driving systems may need to constantly analyze the surroundings of a vehicle to avoid accidents, such as a collision with another vehicle. Such analysis may include target detection around a vehicle. The systems may communicate with a driving vehicle using radars to collect data surrounding the vehicle and then analyze the collected data for target detection. When using a single radar, the radar may receive radar signals from different paths. For example, one path is directly from a target whereas another path is from a non-target object. The radar signal from the non-target object may interfere with the radar signal from the target, which may cause null spaces in the signal further used to detect the target. The aforementioned problem is known as a multipath effect. As a result, using such a signal to detect a target may be unreliable, which may lead to degraded performance of object detection in transportation management and autonomous vehicle operations.

Figure 1A:
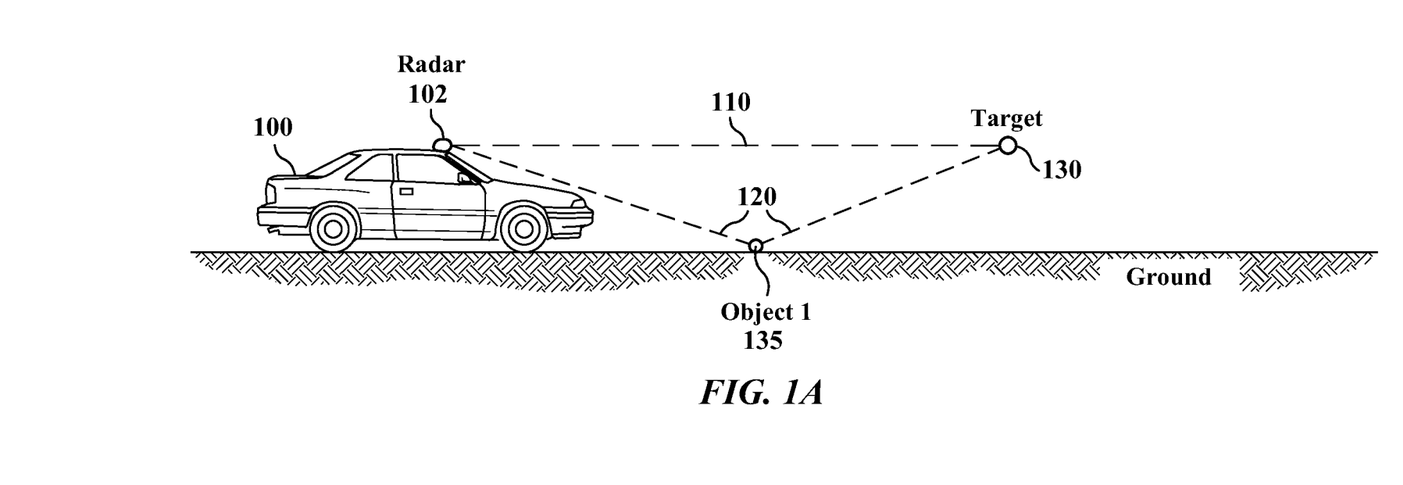
FIG. 1A illustrates an example scenario of multipath propagation of radar signals for a single radar.
Figure 1B:
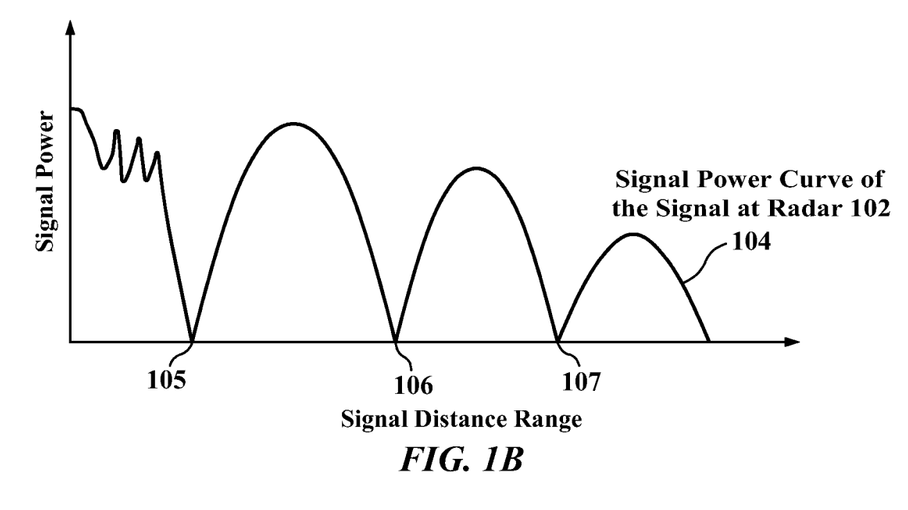
FIG. 1B illustrates an example of a signal power curve for the single radar resulting from a multipath effect.

FIGS. 1A-1B illustrate example scenarios of a multipath effect problem for target detection using radar. FIG. 1A illustrates an example scenario of multipath propagation of radar signals for a single radar. In FIG. 1, there is a vehicle 100 on top which a radar 102 is placed. The radar 102 is used to detect nearby targets. Ideally, the radar 102 may receive a radar signal directly from a target 130 via a path 110. Once the radar 102 receives such a radar signal, it may perform target detection accordingly. However, in reality, the radar 102 may receive not only the radar signal from the target but also some interfering signal. Particularly, the interfering signal may be a reflective signal caused by nearby irrelevant objects. In particular embodiments, irrelevant objects may indicate objects are not the detection targets of a radar. As an example and not by way of limitation, another vehicle or a pedestrian may be a detection target. By contrast, a speed bump or mud on the road may not be detection targets, which may be considered as irrelevant objects. As indicated by FIG. 1, the radar is supposed to detect target 150, e.g., another vehicle. The radar signals from target 130 may reach an object 135 (Object 1) via path 120. The object 135 may be an irrelevant object, e.g., mud on the ground. The object 135 may then reflect the radar signals back to the radar 102, which continues the path 120. As a result, the radar 102 may receive signals from two different paths, i.e., path 110 and path 120. These two received signals may interfere with each other, which is known as a multipath effect. A multipath effect may cause inaccurate detection of the target 130 or even miss detection of the target 130. FIG. 1B illustrates an example of a signal power curve for the single radar resulting from a multipath effect. As mentioned above, a multipath effect may cause inaccurate detection of a target or miss detection of the target. Such effect may be visualized by the signal power curve of the signal received at a radar. As illustrated in FIG. 1B, the signal power curve 104 of the signal at radar 102 may comprise several null spaces with respect to the signal distance range. For example, there may be null space 105, null space 106, and null space 107. Those null spaces may cause the inaccurate detection of the target 130 or even miss detection of the target 130.

To address the aforementioned problem, the embodiments disclosed herein include a method for improving the accuracy of detection of targets in nearby region of a vehicle during vehicle operation by using multiple radars at different heights. In vehicle operation, several radars may be installed on a vehicle as sensors for detecting targets around the vehicle. These radars at different heights may cover the same lateral scope. For example, one radar may be installed on the rooftop of the vehicle and another radar may be installed near the bumper. Each radar may have its own field of view, which may be the angular cone perceivable by the radar at a particular time instant. Each radar may also have its own transmission parameters so that their signals would not interfere with each other. Each radar may have radar signals from multiple paths (e.g., 2), for which each signal generated from the multiple paths may have its own null spaces. However, the null spaces for each radar may be different. Hence, when combining signals of the two radars, the null spaces would be reduced, thereby increasing the detection accuracy of the target. As such, the accuracy of detecting a target in nearby regions may be increased.

Embodiments described herein have several advantages. One advantage is increasing the accuracy of target detection in a nearby region of an operating vehicle. This advantage may be attributed to using multiple radars placed at different heights of a vehicle. Another advantage is reducing blind spots of a driving vehicle as the multiple radars have an overlapping field of view. The reducing of blind spots can further reduce risks of accidents such as collisions.

Figure 2:
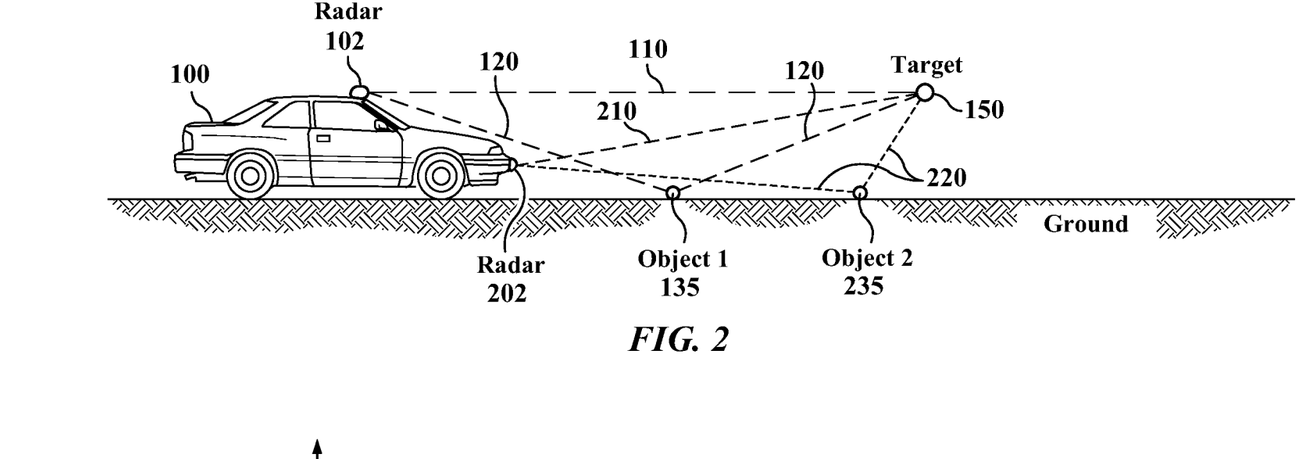
FIG. 2 illustrates an example scenario of mitigating multipath effect for effective detection of a target.

FIG. 2 illustrates an example scenario of mitigating multipath effect for effective detection of a target. In particular embodiments, a computing system may receive, from a first radar, a first signal. The first signal may be associated with a first multipath effect. In particular embodiments, a signal being associated with a multipath effect may be characterized by a signal power curve as exemplified in FIG. 1B. In other words, the signal power curve of the first signal may have null spaces that can be associated with a first pattern (i.e., the null spaces are at particular signal distances). In particular embodiments, the first radar may be installed on a vehicle at a first height. As an example and not by way of limitation, the first radar may be installed on the roof of the vehicle. The first radar may be associated with its own radar signal. For example, in FIG. 2, the first radar may be radar 102 which is installed on the rooftop of the vehicle 100. In particular embodiments, the computing system may also receive, from a second radar, a second signal. The second signal may be associated with a second multipath effect. Similarly, the signal power curve of the second signal may have null spaces that can be associated with a second pattern (i.e., the null spaces are at other particular signal distances). In particular embodiments, the second radar may be installed on the vehicle at a second height. The first height and the second height may be different. As an example and not by way of limitation, the height difference may be at least one meter. In FIG. 2, the second radar may be radar 202 which is installed near the bumper of the vehicle 100. As can be seen, the heights of these two radars are different. In particular embodiments, a difference between the first height and the second height may be configured to generate a mitigation of the first multipath effect and the second multipath effect. A mitigation of the first multipath effect and the second multipath effect may indicate that the null spaces associated with the signal power curve of the first signal are different from the null spaces associated with the signal power curve of the second signal, thereby increasing the target detection rate by using both radars. In particular embodiments, the difference between the first height and the second height may be determined in different ways. One way may be determining the difference by analyzing the null spaces of a plurality of signal power curves associated with a plurality of radar signals. These radar signals may be collected from driving vehicles in a time period. Another way may be determining the difference by predefining a range and selecting a value from the range based on one or more of where the vehicle is operated and the types of the radars installed on the vehicle. Another way may be determining the difference by defining a minimum height difference and adjusting the difference according to the target detection rate. In particular embodiments, the first radar may be installed at a first location of the vehicle. The second radar may be installed at a second location of the vehicle. The first location and the second location may have a horizontal separation from each other. In other words, the two radars may be installed at different heights, but they do not need to be vertically aligned. Continuing with the example in FIG. 2, it can be seen that radar 102 and radar 202 are separated from each other horizontally. In particular embodiments, the first radar 102 and the second radar 202 may have an overlapping field of view and radar signals associated with the first radar 102 and radar signals associated with the second radar 202 may have different transmission parameters. In particular embodiments, the computing system may further determine, based on the first signal and the second signal, that a target exists in the overlapping field of view.

In particular embodiments, the first signal may be based on a first received radar signal at the first radar from a first path and a second received radar signal at the first radar from a second path. For example, in FIG. 2 a received radar signal at the first radar 102 is from a first path 110 and another received radar signal at the first radar 102 is from a second path 120. In particular embodiments, the second signal may be based on a third received radar signal at the second radar 202 from a third path and a fourth received radar signal at the second radar from a fourth path. For example, in FIG. 2 a received radar signal at the second radar 202 is from a third path 210 and another received radar signal at the second radar 202 is from a fourth path 220.

In particular embodiments, the first received radar signal at the first radar 102 may be a first direct radar signal from the target 130. As an example and not by way of limitation, the target 130 may be another vehicle. As displayed in FIG. 2, the target 130 transmits a signal directly to the first radar 102 via the first path 110. The second received radar signal at the first radar 102 may be a first reflected signal from a first object. As displayed in FIG. 2, a signal from the target 130 is reflected by a first object 135 which then goes to the first radar 102, which forms the second path 120. In particular embodiments, the third received radar signal at the second radar 202 may be a second direct radar signal from the target 130. As displayed in FIG. 2, the target 130 transmits a signal directly to the second radar 202 via the third path 210. The fourth received radar signal at the second radar 202 may be a second reflected signal from a second object. As displayed in FIG. 2, a signal from the target 130 is reflected by a second object 235 (Object 2) which then goes to the second radar 202, which forms the fourth path 220.

Figure 3:
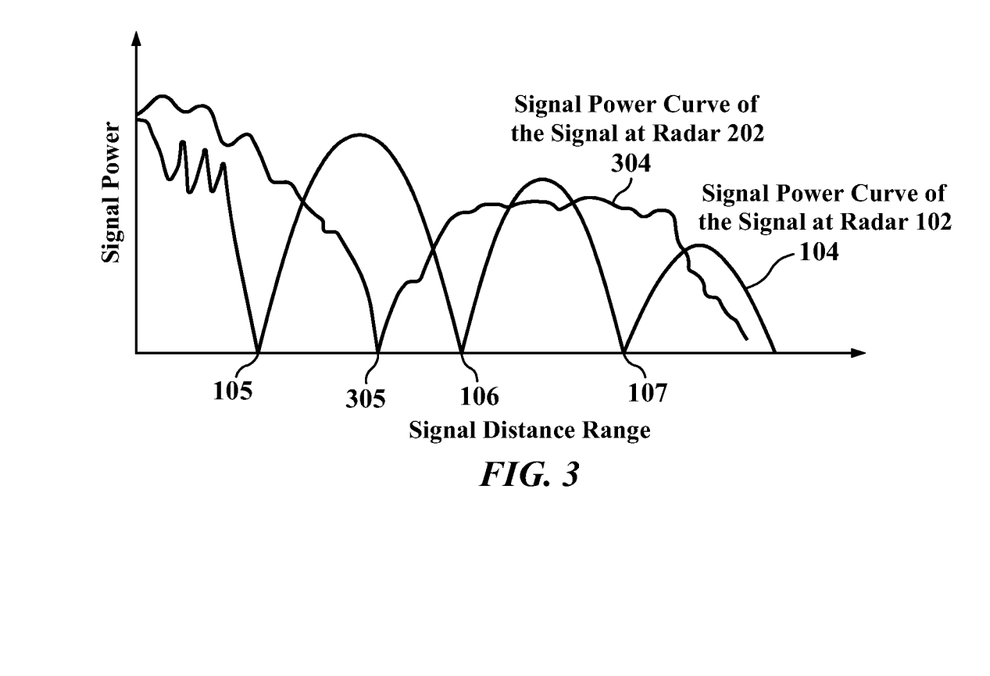
FIG. 3 illustrates example signal power curves associated with two signals.

FIG. 3 illustrates example signal power curves associated with two signals. In real-world operations, the first received radar signal at the first radar 102 and the second received radar signal at the first radar 102 may interfere each other, which may lead to them canceling each other. As displayed in FIG. 3, the signal power curve 104 may characterize the first signal corresponding to the first radar 102. In particular embodiments, the first signal may be associated with a first signal power comprising one or more first null spaces in a signal distance range. As displayed in FIG. 3, the signal power curve 104 has several null spaces including null space 105, null space 106, and null space 107. These null spaces of the signal power curve 104 may indicate the first received radar signal at the first radar 102 and the second received radar signal at the first radar 102 interfere with each other, i.e., they have a phase shift. Such phase shift may cause the null spaces, which may prevent the first radar 102 from detecting the target 130. As displayed in FIG. 3, the signal power curve 304 may characterize the second signal corresponding to the second radar 202. In particular embodiments, the second signal may be associated with a second signal power comprising one or more second null spaces in the signal distance range. The first null spaces may be different from the second null spaces. For example, the signal power curve 304 has different null spaces, i.e., only null space 305. As such, when integrating the first signal and the second signal, the null spaces may be filled up. In other words, the null spaces may be reduced. As a result, the integration may enable the detection of the target 130.

In particular embodiments, the computing system may further determine, based on the first signal and the second signal, that a target 130 exists in the overlapping field of view. Determining the target 130 exists in the overlapping field of view based on the first signal and the second signal may comprise integrating the first signal power with the second signal power to detect the target in the overlapping field of view. In particular embodiments, determining the target exists in the overlapping field of view based on the first signal and the second signal may comprise the following steps. The computing system may generate a first detection result based on the first signal. The first detection result may comprise a first probability indicating a likelihood that the target exists in the overlapping field of view. The computing system may then generate a second detection result based on the second signal. The second detection result may comprise a second probability indicating the likelihood that the target exists in the overlapping field of view. The computing system may further determine that the target exists in the overlapping field of view if either the first probability or the second probability is greater than a threshold probability. As an example and not by way of limitation, the first probability may be 0.32, the second probability may be 0.78, and the threshold probability may be 0.5. Thus, the computing system may determine the target exists because the second probability is greater than 0.5. As another example and not by way of limitation, the first probability may be 0.32, the second probability may be 0.41, and the threshold probability may be 0.5. Thus, the computing system may determine the target does not exist as neither of the two second probabilities is greater than 0.5. As a result, the second radar 202 may work as a complementary measure for the first radar 102. If the first radar 102 misses detecting the target 130, the second radar 202 may detect it, and vice versa. By using both radars, the computing system may have a full coverage of the field of view, which helps the effective detection of the target 130.

In particular embodiments, determining the target exists in the overlapping field of view based on the first signal and the second signal may comprise the following steps. The computing system may first determine a first weight for the first signal based on a signal strength associated with the first signal. The computing system may then generate a first detection result based on the first signal. The first detection result may comprise a first probability indicating a likelihood that the target exists in the overlapping field of view. In particular embodiments, the computing system may apply the first weight to the first probability to generate a weighted first probability. The computing system may then determine a second weight for the second signal based on a signal strength associated with the second signal. The computing system may then generate a second detection result based on the second signal. The second detection result may comprise a second probability indicating a likelihood that the target exists in the overlapping field of view. In particular embodiments, the computing system may then apply the second weight to the second probability to generate a weighted second probability. The computing system may further determine the target exists in the overlapping field of view based on the weighted first probability and the weighted second probability. The aforementioned approach may reflect the confidence of the computing system on using the signals from the two radars, which is based on their respective signal strength. The stronger the signal is, the more confident the computing system is on the target detection result.

In particular embodiments, radar signals associated with the first radar 102 and radar signals associated with the second radar 202 may have different transmission parameters. The transmission parameters associated with each radar signal may be determined based on one or more of polarization associated with the radar signal, frequency associated with the radar signal, or pulse shape associated with the radar signal. In particular embodiments, each of the aforementioned factor may affect the transmission parameters, which may further affect the power curve resulted from the interference between the signals from different paths. In particular embodiments, polarization may comprise one or more of parallel polarization or perpendicular polarization. As an example and not by way of limitation, the first radar 102 may use a first polarization, which may result the first signal power curve 104 having particular null spaces. The second radar 202 may use a second polarization, which is different from the first polarization. As a result, the second signal power curve 304 associated with the second radar 202 may have other particular null spaces, which are different from those of the first signal power curve 104. This way, when using the two radars to detect the target, the null spaces may be mitigated as they are different from each other because of the usage of different polarizations. In particular embodiments, changing pulse shape is the process of changing the waveform of transmitted pulses. Its purpose is to make the transmitted signal better suited to its purpose or the communication channel, typically by limiting the effective bandwidth of the transmission. By filtering the transmitted pulses this way, the inter-symbol interference caused by the channel can be kept in control. In radar communication, changing pulse shape is essential for making the signal fit in its frequency band, which typically occurs after line coding and modulation. Similarly, changing pulse shape may affect the transmission parameters to make sure that the power curves associated with two different radars have different null spaces, which may help mitigate multipath effect.

In particular embodiments, the computing system may leverage polarization, frequency, pulse shape, or any combination thereof to mitigate the multipath effect, which may be implemented by one or more radars. In particular embodiments, the computing system may leverage one or more maps to determine whether to use one radar or more than one radars. Such maps may provide information about whether there exist irrelevant objects causing multipath effect, e.g., a speed bump. As an example and not by way of limitation, two radars may be installed on a vehicle and the computing system may adaptively turn on and off one radar of the two based on the maps. In particular embodiments, when only one radar is installed on a vehicle, the computing system may use polarization as follows to mitigate the multipath effect. The computing system may instruct the radar to emit a first signal and receive its reflected signal based on a first polarization. The computing system may then instruct the radar to emit a second signal based on the first polarization but receive the reflected second signal based on a second polarization that is different from the first polarization. The computing system may then determine if a target exist based on the signals from both radars. If the first radar missed detecting the target, the second radar may detect it, and vice versa. This way, the two radars may compensate each other regarding target detection. In particular embodiments, when only one radar is installed on a vehicle, the computing system may use pulse shape as follows to mitigate the multipath effect. The computing system may instruct the radar to emit a signal based on a pulse shape. The radar may receive a reflected signal from a target, which may be based on the same pulse shape. The radar may additionally receive a reflected signal from an irrelevant object, which may be based on a different pulse shape. Because of the different pulse shape, the computing system may determine that the reflected signal from the irrelevant object is noise and thus discard it, which mitigates the multipath effect.

Figure 4:
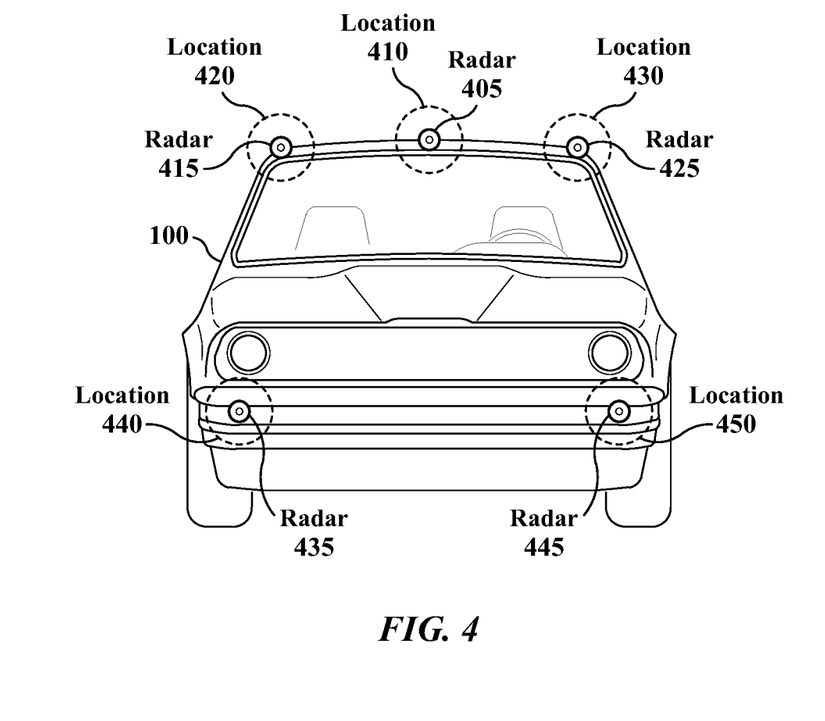
FIG. 4 illustrates example placements of radars for mitigating multipath effect.

FIG. 4 illustrates example placements of radars for mitigating multipath effect. In particular embodiments, the computing system may mitigate multipath effect by placing two or more radars at different locations. As illustrated in FIG. 4, any two or more of radar 405, radar 415, radar 425, radar 435, and radar 445 may be placed at their respective locations, i.e., location 410, location 420, location 430, location 440, and location 450 to mitigate multipath effect. Taking two radars as an example, radar 405 may be placed at location 410 while radar 415 being placed at location 420. Such placement may mitigate multipath effect. Alternatively, radar 425 may be placed at location 430 while radar 435 being placed at location 440. Such placement may similarly mitigate multipath effect. Taking three radars as an example, radar 405 may be placed at location 410 while radar 415 and radar 425 being placed at location 420 and location 430, respectively. Such placement may mitigate multipath effect. Alternatively, radar 415 may be placed at location 420 while radar 435 and radar 445 being placed at location 440 and location 450, respectively. Such placement may similarly mitigate multipath effect.

Figure 5:
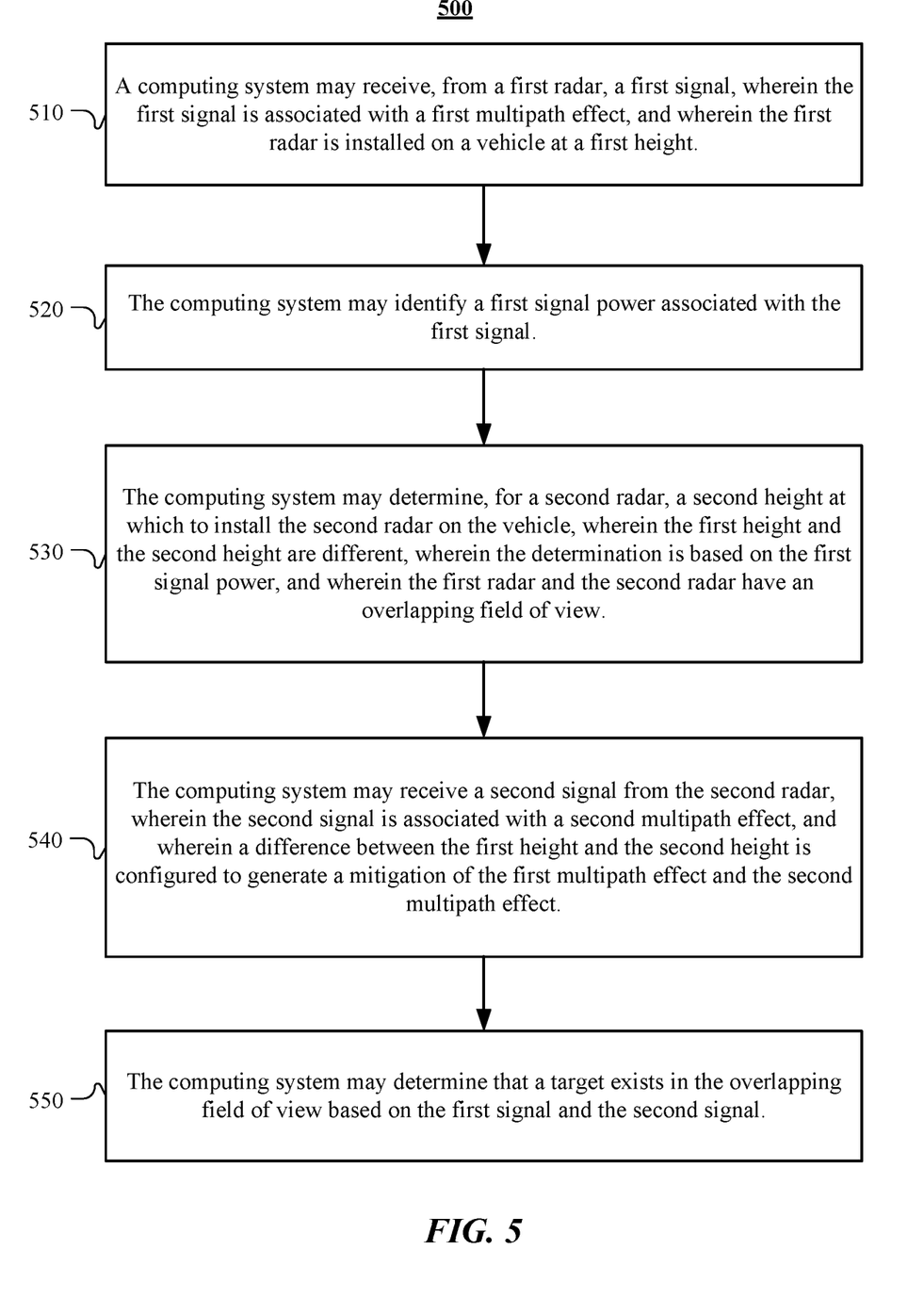
FIG. 5 illustrates an example of a method for mitigating multipath effect.

FIG. 5 illustrates an example method 500 for mitigating multipath effect. The method may begin at step 510, where a computing system may receive, from a first radar, a first signal, wherein the first signal is associated with a first multipath effect, and wherein the first radar is installed on a vehicle at a first height. At step 520, the computing system may identify a first signal power associated with the first signal. At step 530, the computing system may determine, for a second radar, a second height at which to install the second radar on the vehicle, wherein the first height and the second height are different, wherein the determination is based on the first signal power, and wherein the first radar and the second radar have an overlapping field of view. At step 540, the computing system may receive a second signal from the second radar, wherein the second signal is associated with a second multipath effect, and wherein a difference between the first height and the second height is configured to generate a mitigation of the first multipath effect and the second multipath effect. At step 550, the computing system may determine that a target exists in the overlapping field of view based on the first signal and the second signal. Particular embodiments may repeat one or more steps of the method of FIG. 5, where appropriate. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates an example method for mitigating multipath effect including the particular steps of the method of FIG. 5, this disclosure contemplates any suitable method for mitigating multipath effect including any suitable steps, which may include all, some, or none of the steps of the method of FIG. 5, where appropriate. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

Figure 6:
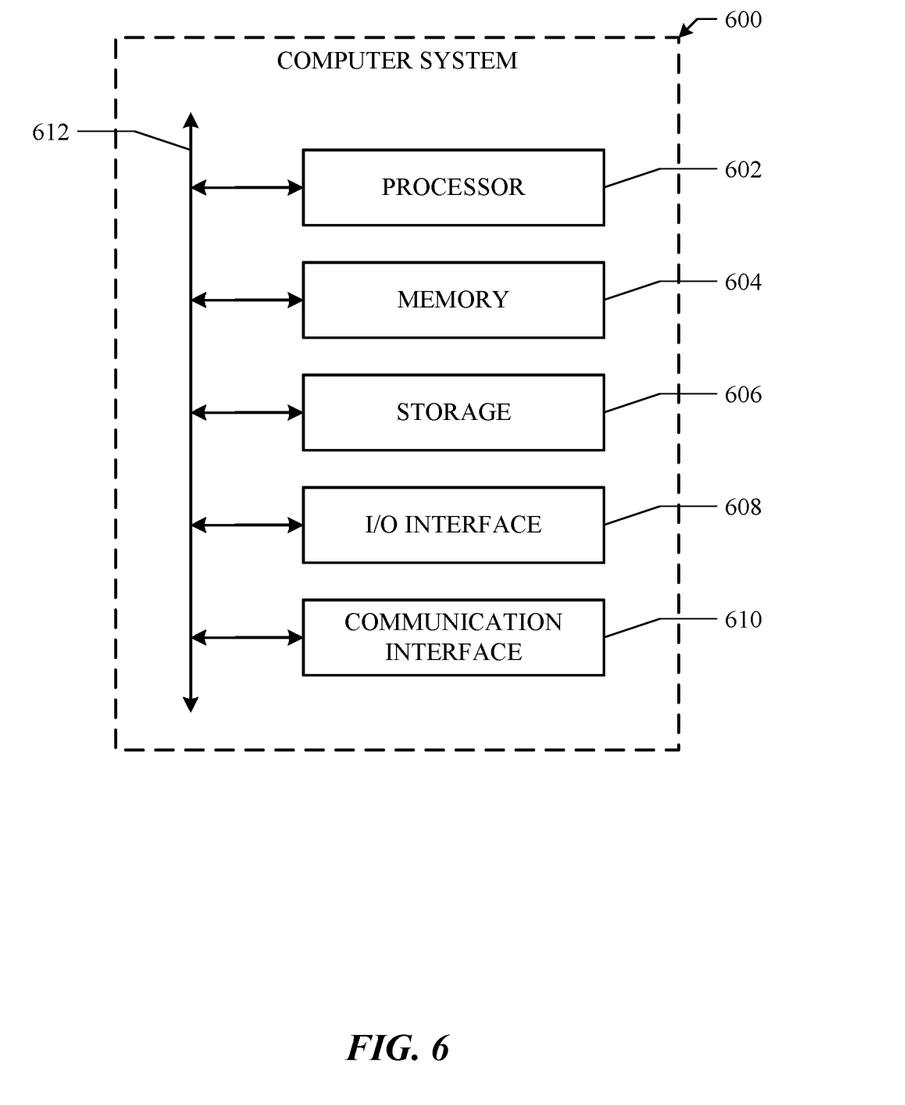
FIG. 6 illustrates an example of a computing system.

FIG. 6 illustrates an example computer system 600. In particular embodiments, one or more computer systems 600 perform one or more steps of one or more methods described or illustrated herein. In particular embodiments, one or more computer systems 600 provide the functionalities described or illustrated herein. In particular embodiments, software running on one or more computer systems 600 performs one or more steps of one or more methods described or illustrated herein or provides the functionalities described or illustrated herein. Particular embodiments include one or more portions of one or more computer systems 600. Herein, a reference to a computer system may encompass a computing device, and vice versa, where appropriate. Moreover, a reference to a computer system may encompass one or more computer systems, where appropriate.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 that are to be operated on by computer instructions; the results of previous instructions executed by processor 602 that are accessible to subsequent instructions or for writing to memory 604 or storage 606; or any other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs), be a multi-core processor, or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described in further detail below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include a hard disk drive (HDD), a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both, providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or any other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a Bluetooth WPAN), a WI-FI network, a WI-MAX network, a cellular telephone network (such as, for example, a Global System for Mobile Communications (GSM) network), or any other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or any other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other types of integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising:
receiving, from a first radar installed on a vehicle at a first height, a first signal associated with a first multipath effect;
receiving, from a second radar installed on the vehicle at a second height that differs from the first height, a second signal associated with a second multipath effect, wherein a difference between the first height and the second height mitigates the first multipath effect and the second multipath effect, and wherein the first radar and the second radar have an overlapping field of view;
determining a first probability and a second probability that a target exists in the overlapping field of view based upon the first signal and the second signal, respectively;

determining a first weight and a second weight based upon respective signal strengths of the first signal and the second signal; and determining that the target exists in the overlapping field of view based upon the first weight applied to the first probability and the second weight applied to the second probability.

2. The method of claim 1, wherein radar signals associated with the first radar and radar signals associated with the second radar have different transmission parameters.

3. The method of claim 2, wherein the different transmission parameters associated with each radar signal are determined based on one or more of:
   polarization associated with a radar signal;
   frequency associated with the radar signal; or
   pulse shape associated with the radar signal.

4. The method of claim 1, wherein the first signal is based on a first received radar signal at the first radar from a first path and a second received radar signal at the first radar from a second path, and wherein the second signal is based on a third received radar signal at the second radar from a third path and a fourth received radar signal at the second radar from a fourth path.

5. The method of claim 4, wherein the first received radar signal at the first radar is a first direct radar signal from the target, wherein the second received radar signal at the first radar is a first reflected signal from a first object, wherein the third received radar signal at the second radar is a second direct radar signal from the target, and wherein the fourth received radar signal at the second radar is a second reflected signal from a second object.

6. The method of claim 1, wherein the first signal is associated with a first signal power comprising one or more first null spaces in a signal distance range, where the second signal is associated with a second signal power comprising one or more second null spaces in the signal distance range, and wherein the first null spaces are different from the second null spaces.

7. The method of claim 6, wherein determining that the target exists in the overlapping field of view further comprises:
   integrating the first signal power with the second signal power to detect the target in the overlapping field of view.

8. The method of claim 1, wherein the first height and the second height are determined by analyzing null spaces of a plurality of signal power curves associated with a plurality of vehicles.

9. The method of claim 1, wherein the first height and the second height are determined by predefining a range and selecting a value from the range based upon respective types of the first radar and the second radar.

10. The method of claim 1, wherein the first radar is installed at a first location of the vehicle, wherein the second radar is installed at a second location of the vehicle, and wherein the first location and the second location have a horizontal separation from each other.

11. A system comprising: a processor and a computer-readable non-transitory storage media coupled to the processor, the computer-readable non-transitory storage media comprising instructions operable when executed by the processor to cause the system to:
   receive, from a first radar installed on a vehicle at a first height, a first signal associated with a first multipath effect;
   receive, from a second radar installed on the vehicle at a second height that differs from the first height, a second signal associated with a second multipath effect, wherein a difference between the first height and the second height mitigates the first multipath effect and the second multipath effect, and wherein the first radar and the second radar have an overlapping field of view;
   determine a first probability and a second probability that a target exists in the overlapping field of view based upon the first signal and the second signal, respectively;
   determine a first weight and a second weight based upon respective signal strengths of the first signal and the second signal; and
   determine that the target exists in the overlapping field of view based upon the first weight applied to the first probability and the second weight applied to the second probability.

12. The system of claim 11, wherein radar signals associated with the first radar and radar signals associated with the second radar have different transmission parameters.

13. The system of claim 12, wherein the different transmission parameters associated with each radar signal are determined based on one or more of:
   polarization associated with a radar signal;
   frequency associated with the radar signal; or
   pulse shape associated with the radar signal.

14. The system of claim 11, wherein the first signal is based on a first received radar signal at the first radar from a first path and a second received radar signal at the first radar from a second path, and wherein the second signal is based on a third received radar signal at the second radar from a third path and a fourth received radar signal at the second radar from a fourth path.

15. The system of claim 14, wherein the first received radar signal at the first radar is a first direct radar signal from the target, wherein the second received radar signal at the first radar is a first reflected signal from a first object, wherein the third received radar signal at the second radar is a second direct radar signal from the target, and wherein the fourth received radar signal at the second radar is a second reflected signal from a second object.

16. The system of claim 11, wherein the first signal is associated with a first signal power comprising one or more first null spaces in a signal distance range, where the second signal is associated with a second signal power comprising one or more second null spaces in the signal distance range, and wherein the first null spaces are different from the second null spaces.

17. The system of claim 16, wherein determining that the target exists in the overlapping field of view further comprises instructions to:
   integrate the first signal power with the second signal power to detect the target in the overlapping field of view.

18. The system of claim 11, wherein the first height and the second height are determined by analyzing null spaces of a plurality of signal power curves associated with a plurality of vehicles.

19. The system of claim 11, wherein the first height and the second height are determined by predefining a range and selecting a value from the range based upon respective types of the first radar and the second radar.

20. A computer-readable non-transitory storage media embodying software that is operable when executed to cause a processor to perform operations comprising:
   receiving, from a first radar installed on a vehicle at a first height, a first signal associated with a first multipath effect;

receiving, from a second radar installed on the vehicle at a second height that differs from the first height, a second signal associated with a second multipath effect, wherein a difference between the first height and the second height mitigates the first multipath effect and the second multipath effect, and wherein the first radar and the second radar have an overlapping field of view;

determining a first probability and a second probability that a target exists in the overlapping field of view based upon the first signal and the second signal, respectively;

determining a first weight and a second weight based upon respective signal strengths of the first signal and the second signal; and determining that the target exists in the overlapping field of view based upon the first weight applied to the first probability and the second weight applied to the second probability.

\* \* \* \* \*